(No Model.)
A. N. WOLF
GRINDING MILL.
No. 279,067. Patented June 5, 1883.
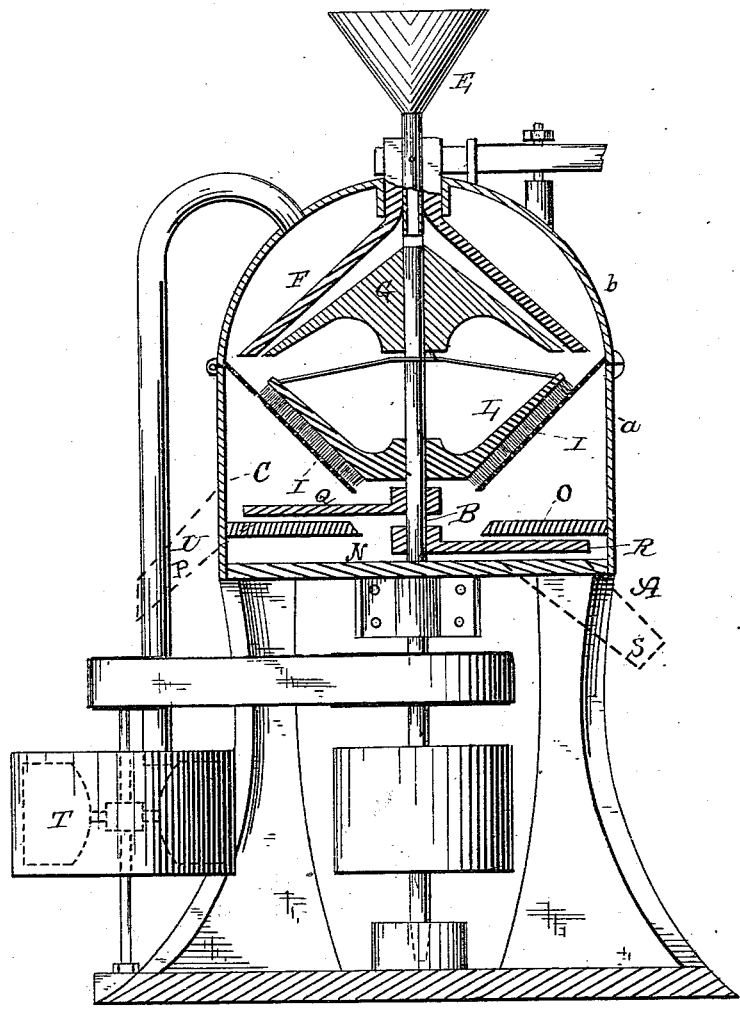
Witnesses.
Louis F. Gardner
J. W. Garner
Inventor.
A. N. Wolf
per
J. A. Lehmann,
Atty.

UNITED STATES PATENT OFFICE.

ABRAHAM N. WOLF, OF ALLENTOWN, PENNSYLVANIA.

GRINDING-MILL.

SPECIFICATION forming part of Letters Patent No. 279,067, dated June 5, 1883.

Application filed March 31, 1883. (No model.)

*To all whom it may concern:*

Be it known that I, ABRAHAM N. WOLF, of Allentown, in the county of Lehigh and State of Pennsylvania, have invented certain new and useful Improvements in Grinding-Mills; and I do hereby declare the following to be a full, clear, and exact description of the invention, such as will enable others skilled in the art to which it pertains to make and use it, reference being had to the accompanying drawings, which form part of this specification.

My invention relates to an improvement in grinding-mills; and it consists in, first, the combination of the two conical breaking-disks, the screen, the revolving brush, the false bottom, the case or frame bottom, the two scrapers, and the driving-shaft; second, the combination of the two break-disks, the screen, the revolving brush, the false bottom, and the case or frame bottom, the driving-shaft, the scrapers, and a suction-fan, all of which will be more fully described hereinafter.

The object of my invention is to crack the wheat and get rid of the germs and the dirt which are found in the wheat, and thus have only the cracked grains pass out.

The accompanying drawing represents a vertical section of my invention.

A represents a suitable frame, in the center of which is journaled the driving-shaft B. All of the operating parts are inclosed in a suitably-shaped frame, C, which is made in two parts, *a b*, so that the upper part can be drawn back whenever it is found necessary to repair any of the moving parts, or for any other purpose. Mounted upon the top of this frame is the hopper E, and secured in the top of the frame around this hopper is the stationary chilled cast-iron concave disk F, which is made vertically adjustable by means of the screw and lever generally used for this purpose. The inner side of this concave disk will be roughened either the whole of its length on its under side, or only toward the lower end, as may be preferred. Secured to the upper end of the driving-shaft is the convex disk G, which fits inside of the concave one, and which will have a roughened surface, so as to act in conjunction with the concave one for breaking the grain as it passes from the hopper down in between them. It will be seen that these disks approach each other more closely at their lower ends than at any other point, so that the wheat will flow freely down in between them, be gradually reduced, and receive its final breaking before it escapes at the lower edges. Placed inside of the frame, just below the lower edges of these two disks, is the inclined screen I, which has perforations made through it just large enough to allow the germs and the dirt in the wheat to be forced through, and which perforations are not large enough to allow any of the cracked portions of the grain itself to be forced through. In order to force through the germs and dirt the revolving conical brush L is attached to the shaft, and this brush plays over the grain, as shown, so as to force the germs and dirt through. The cracked portions of the grain gradually work down through between the brush and the screen and drop on the bottom of the frame at N. All of the germs and the dirt which is forced through the screen by the brush falls upon the false bottom O, which is placed to receive it, and from which this reduced portion is swept into the seed-spout P by means of the scraper Q, which is secured to the driving-shaft. A second scraper, R, is also secured to the driving-shaft under the false bottom, and this scraper forces out the cracked grain through the spout S. A suction-fan, T, is connected to the mill by means of the pipe U, and this fan keeps up a constant upward draft through the mill, so as to draw away all the dust and fine particles.

This mill can be used either in connection with another mill, into which the cracked grain will pass at once to be ground, or it may be used entirely by itself, as is here represented. I do not limit myself to any details of construction in this respect, for this may be varied at will.

Having thus described my invention, I claim—

1. The combination of the two conical breaking-disks, the screen, the revolving brush, the false bottom, the case or frame bottom, the two scrapers, and the driving-shaft, substantially as described.

2. The combination of the two breaking-disks, the screen, the revolving brush, the false bottom, and the case or frame bottom, the driving-shaft, the scrapers, and a suction-fan, all being arranged to operate substantially as set forth.

In testimony whereof I affix my signature in presence of two witnesses.

ABRAHAM N. WOLF.

Witnesses:
J. FRED WEINSHEIMER,
WILLIAM W. OSMUN.